United States Patent [19]

Dohany

[11] 4,141,873

[45] Feb. 27, 1979

[54] VINYLIDENE FLUORIDE POLYMER FILM-FORMING COMPOSITION IN AQUEOUS DISPERSION

[75] Inventor: Julius E. Dohany, Berwyn, Pa.

[73] Assignee: Pennwalt Corporation, Philadelphia, Pa.

[21] Appl. No.: 527,838

[22] Filed: Nov. 27, 1974

Related U.S. Application Data

[63] Continuation of Ser. No. 254,520, May 18, 1972, abandoned.

[51] Int. Cl.² ............................................. C08L 27/08
[52] U.S. Cl. ........................... 260/29.6 F; 427/385 R; 427/388 C; 428/421; 428/500
[58] Field of Search ................... 260/29.6 F; 428/421, 428/500; 427/385 R, 388 C

[56] References Cited

U.S. PATENT DOCUMENTS

| | | | |
|---|---|---|---|
| 2,810,702 | 10/1957 | Bechtold et al. | 260/29.6 |
| 3,324,069 | 6/1967 | Koblitz et al. | 260/31.4 |
| 3,340,222 | 9/1967 | Fang | 260/41 |
| 3,679,618 | 7/1972 | Lohr | 260/21 |

*Primary Examiner*—Lester L. Lee
*Attorney, Agent, or Firm*—Plumley and Tyner

[57] ABSTRACT

Aqueous dispersions of vinylidene fluoride polymer containing admixed therewith dispersed acrylate polymer are useful for forming coatings on various substrates which are free of organic solvent pollution effects and which may be air-dried at ambient temperature.

23 Claims, No Drawings

VINYLIDENE FLUORIDE POLYMER FILM-FORMING COMPOSITION IN AQUEOUS DISPERSION

This is a continuation, of application, Ser. No. 254,520, filed May 18, 1972 now abandoned.

This invention concerns a film-forming composition comprised of a mixture of vinylidene fluoride polymer and acrylate polymer dispersed in aqueous medium which is useful to coat a variety of substrates with a film that may be air-dried at ambient temperature to form a strong and protective coating.

Various systems have been devised for laying down films and protective coatings of normally solid, high molecular weight vinylidene fluoride polymers to give substrates the protection of polymeric coatings which have good solvent resistance, chemical resistance, weather resistance, heat stability, strength, and resilience. However, these known systems have certain disadvantages with regard to processing conditions and environmental contamination. For example, U.S. Pat. No. 3,169,120 describes vinylidene fluoride polymer particles dispersed in an aqueous composition containing a major proportion of at least one water-miscible solvent selected from the group consisting of triethylphosphate, dimethyl succinate, diethyl succinate and tetraethyl urea. The disadvantages of this system are the presence of large amounts of undesirable, high-boiling point solvents and the necessity for drying and curing the polymer film at temperatures in excess of about 350° F. U.S. Pat. Nos. 3,324,069 and 3,340,222 deal with film-forming compositions comprised to vinylidene fluoride polymer and an acrylate polymer dispersed in a latent solvent for the vinylidene fluoride polymer, the latent solvent being a volatile organic liquid. The polymer films and coatings formed from such non-aqueous dispersions are dried and cured at temperatures on the order of 450° F. With the ever increasing emphasis being placed on environmental protection, the presence of large amounts of such volatile and toxic organic solvents in coating compositions is objectionable because of their air-polluting effects. The vaporization of the large quantity of solvent from the film-forming polymer composition during coalesence of the coatings also creates the and explosion hazards as well as air pollution. In addition, solvent removal techniques and solvent recovery procedures, if instituted, are quite costly. Even then, disposal by burning and water scrubbing still give combusition and other by-products which contribute to various types of ecological pollution.

It has now been discovered that high quality vinylidene fluoride polymer films and coatings can be prepared from non-polluting, substantially solvent-free, aqueous dispersion of vinylidene fluoride polymer containing in admixture therewith a modifying amount of an aqueous dispersion of acrylate polymer. It has further been discovered that the presence of acrylate polymer permits drying and curing of the polymer film at ambient temperature, i.e., about 60 to 120° F., although, it desired, the films and coatings may be quickly dried and cured at high temperatures, i.e., up to about 550° F.

The composition of this invention is comprised of, based on 100 parts by weight of water and dispersed in said aqueous medium, from 10 to 180 parts by weight of vinylidene fluoride polymer (preferably 15 to 95) and from 1 to 150 parts by weight of acrylate polymer (preferably 6 to 55), there being no more than about 200 parts by weight of both polymers combined, and the acrylate polymer being from about 10% to about 75% by weight of the total weight of said polymers mixture, with the preferred proportion of acrylate polymer being from about 25% to 60% by weight of the combined weight of the polymers. Formulations containing less than 25% by weight of the acrylate polymer do not form a coherent film as readily at room temperature, and some heating, up to about 200° F., may be advantageous in the drying step to achieve satisfactory film formation. The advantageous characteristics of the high-performance vinylidene fluoride polymer in the ultimate film or coating are diminished, however, when the proportion of the acrylate polymer is greater than 60% by weight of said polymers mixture.

By the term "vinylidene fluoride polymer" used herein is meant not only the high molecular, weight normally solid homopolymer of vinylidene fluoride but also the high molecular weight normally solid copolymers of vinylidene fluoride with at least one comonomer selected from the group consisting of tetrafluoroethylene, trifluoroethylene, chlorotrifluoroethylene, hexafluoropropene and mixtures thereof, there being in said copolymer at least about 75 mole % of polymerized vinylidene fluoride units. A particularly preferred copolymer is that composed of about 70 weight percent vinylidene fluoride and correspondingly about 30 weight percent of tetrafluoroethylene. The vinylidene fluoride polymer is present in the dispersion embodied herein as dispersed particles having a particle size range of 0.1 micron or smaller up to about one micron.

The acrylate polymer embodied in the aqueous dispersion of this invention is derived from a monomer of the structure

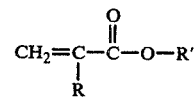

where R is selected from the group consisting of hydrogen and methyl and R' is lower alkyl, that is, an alkyl radical containing from 1 to 4 carbon atoms. Such acrylate polymers include the normally solid, high molecular weight homopolymers of the acrylate monomers and the normally solid high molecular weight copolymers thereof. The preferred acrylate polymer is polymethyl methacrylate. The preferred copolymers are those containing from 10% to 40%, preferably from 10% to 20% by weight, of a comonomer, such comonomers, including those having the above structure, being exemplified by acrylic acid, methacrylamide, methacrylic acid, acrylonitrile, methylacrylate, ethylacrylate, ethylmethacrylate, butylacrylate, butyl-methacrylate, and the like. A particularly preferred copolymer is that of butylmethacrylate and methylmethacrylate containing a predominance of polymerized units of the latter.

The acrylate polymer is present in the dispersion embodied herein as dispersed particles of a size within the range of about 0.1 to about 1 micron. The aqueous composition of the dispersed mixture of acrylate polymer and vinylidene fluoride polymer may be characterized as a polymeric latex, and may have admixed therein, to provide latex stability, from about 1 to 5 parts, per 100 parts by weight of non-volatile solids, of a conventional surfactant. Representative surfactants are, for example, the well-known and commerically available alkyl aryl polyether alcohols having polyoxyethylene units on the side chain (sold by Rohm and Haas Co. under the "TRITON" trademark), the block polymers of ethylene oxide and propylene oxide (sold by BASF-Wyandotte Chemical Co. under the "PLURONIC" mark) and polyoxyethylene fatty acid esters (sold by ICI - Atlas Chemical Inc. under the "SPAN" and "TWEEN" marks).

There may also be included in the latex described above a dispersed, finely-divided pigment to give the coating or film the desired opacity, color, or aesthetic appeal. The amount of such finely-divided pigment (e.g. particle size up to 75 microns) may range from about 30 to about 170 parts per 100 parts by weight of the combined weight of the vinylidene fluoride polymer and the acrylate polymer with the provision, however, that total solids in the dispersion is not greater than about 200 parts per 100 parts by weight of water. Representative pigments are rutile titanium dioxide, various silicates such as talc, mica and clays, barytes, carbon black, zinc oxide, zinc sulfide, silicas, iron oxides, chrome oxide, other metal oxides, powdered metals, glass spheres, and mixtures of the foregoing pigments.

An optional ingredient that may be included in the dispersion, in an amount of up to about 10 parts by weight per 100 parts by weight of the combined amount of vinylidene fluoride polymer and acrylate polymer, is an organic liquid, preferably soluble in water in said proportions, which liquid will act as a coalescing aid in the formation of the polymer films during the drying step. Representative coalescing agents which may be used in such minor proportions are butyrolactone, tributyl phosphate, butyl cellosolve acetate, tributoxyethyl phosphate, carbitol acetate. A minor amount of other water-miscible solvents such as ethylene glycol may be mixed in to increase the freeze-thaw stability of the aqueous dispersions.

When the compositions of this invention have included therein the inorganic fillers and pigments as above-described, the dispersions are processed through a high speed blender, a ball mill, three-roll mill, sand mill, or the like, in order to achieve a satisfactory suspension of the solids. In this blended mixture may be included conventional paint and coating additives, such as surfactants, anti-foams, preservatives, protective colloids, thickening agents, pH buffers and others. Dispersions for use on exterior coatings (i.e., subjected to the effects of weather) should preferably have a pH of 8–9. Latexes for other uses can have a pH level anywhere within the range of 4 to 10.

The coating compositions can be applied to a wide variety of substrates including wood, metals, masonry, textiles, fabrics, paper, glass, etc. by conventional coating methods such as spraying, brushing, dipping, casting, knife coating, coil coating, reverse roll coating and other methods known in the art. As mentioned previously, the unexpected advantages of the aqueous dispersion of this invention derive from the discovery that durable, hard, and tough coatings are obtained by air-drying at ambient temperatures, i.e., 60° to 100° F. Accordingly, the coatings may be applied as high performance maintenance paints in plants and other commercial facilities to protect wood and metal surfaces.

Although adhesion of the film of the polymeric mixture to substrates is generally more than adequate, increased adhesion is obtained by first priming the substrates with a compatible coating layer. For example, for wood a useful primer is a layer of pigmented acrylic acid ester polymer as described in U.S. Pat. No. 3,234,039 and in U.S. Pat. No. 3,037,881. For metal coatings a preferred primer layer is described in U.S. 3,111,426, that is an epoxy-based primer. Acrylic-based primers are also useful for metals, as described in U.S. Pat. Nos. 3,526,532, and 3,476,014. For coatings on glass cloth or other flexible substrates, woven or non-woven, known adhesion promoters may be used. In particular, glass fiber may be first treated with a silane coupling agent as described by I. L. Fan and R. G. Shaw, Rubber World, June, 1971, page 56. Air-drying of the aqueous based polymer coatings on substrates such as paper, glass fiber, glass cloth, and non-woven textiles may be accomplished at ambient temperature with drying periods of from about 3 to 24 hours. However with forced air-drying at 120° F. the films will dry in 10 to 15 minutes. At 150° F., about 5 to 10 minutes are adequate using forced air-drying. In all cases, coatings of the polymers mixture are smooth, glossy and uniform, and the films adhere tenaciously to the substrate. Flame resistance and hydrophobicity are imparted by the coatings to such flexible substrates. Although the coatings may be cured at higher temperatues where certain substrates such as metals (e.g., steel and aluminum) are involved, that is temperatures of up to about 550° F., the significance of the water based polymeric latexes of this invention is the ability to provide low temperature - cured coatings by simply air-drying the films.

What is claimed is:

1. A water-based polymer coating composition capable of forming polymer films by drying at a temperature of from ambient temperature to 550° F., consisting essentially of an admixture of aqueous dispersion of solid, high molecular weight vinylidene fluoride polymer, an aqueous dispersion of solid, high molecular weight acrylate polymer particles, and up to 10 parts by weight based on 100 parts of said polymers of a water-soluble organic solvent film-coalescing agent; wherein said composition contains, based on 100 parts by weight of water, from 10 to 180 parts by weight of vinylidene fluoride polymer and 1 to 150 parts by weight of acrylate polymer, no more than about 200 parts by weight of both polymers combined, and the acrylate polymer being from about 10% to about 75% by weight of the total weight of said polymers.

2. The composition according to claim 1 wherein the acrylate polymer is from about 25% to 60% of the combined weight of the polymers.

3. The composition according to claim 1 wherein there are 15 to 95 parts vinylidene fluoride polymer and 6 to 55 parts acrylate polymer.

4. The composition according to claim 3 wherein the acrylate polymer is from about 25% to 60% of the combined weight of the polymers.

5. The composition according to claim 1 wherein the acrylate polymer is of a monomer of the structure

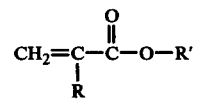

where R is hydrogen or methyl and R' is lower alkyl.

6. The composition according to claim 1 wherein the vinylidene fluoride polymer is a copolymer of vinylidene fluoride and tetrafluoroethylene in about a 70/30 weight ratio.

7. The composition of claim 1 wherein the acrylate polymer is from about 25% to 60% of the combined weight of the polymers.

8. The composition of claim 1 wherein there are 15 to 95 parts vinylidene fluoride polymer and 6 to 55 parts acrylate polymer.

9. The composition of claim 8 wherein the acrylate polymer is from about 25% to 60% of the combined weight of the polymers.

10. The composition of claim 1 wherein the acrylate polymer is of a monomer of the structure

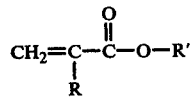

where R is hydrogen or methyl and R' is lower alkyl.

11. The composition of claim 1 wherein the vinylidene fluoride polymer is a copolymer of vinylidene fluoride and tetrafluoroethylene in about a 70/30 weight ratio.

12. The composition of claim 1 wherein the coalescing agent is selected from the group consisting of butyrolactone, tributyl phosphate, butyl cellosolve acetate, tributoxyethyl phosphate and carbitol acetate.

13. The composition of claim 1 wherein the aqueous dispersion contains in admixture from about 30 to about 170 parts per 100 parts by weight of polymer of particulate pigment, provided that the total of pigment and polymer in the dispersion is not greater than about 200 parts per 100 parts by weight of water.

14. The method of making a polymer film on a substrate from a composition consisting essentially of an admixture of aqueous dispersion of solid, high molecular weight vinylidene fluoride polymer, an aqueous dispersion of solid, high molecular weight acrylate polymer particles, and up to 10 parts by weight based on 100 parts of said polymers of a water-soluble organic solvent film-coalescing agent, wherein said composition contains, based on 100 parts by weight of water, from 10 to 180 parts by weight of vinylidene fluoride polymer and 1 to 150 parts by weight of acrylate polymer, no more than about 200 parts by weight of both polymers combined, and the acrylate polymer being from about 10% to about 75% by weight of the total weight of said polymers;

comprising the steps of
(a) applying said composition to a substrate; and
(b) drying said composition at a temperature of 60° F. to 150° F. until a polymer film is formed.

15. The method of claim 14 wherein the acrylate polymer is from about 25% to 60% of the combined weight of the polymers.

16. The method of claim 14 wherein there are 15 to 95 parts vinylidene fluoride polymer and 6 to 55 parts acrylate polymer.

17. The method of claim 16 wherein the acrylate polymer is from about 25% to 60% of the combined weight of the polymers.

18. The method of claim 14 wherein the acrylate polymer is of a monomer of the structure

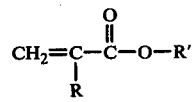

where R is hydrogen or methyl and R' is lower alkyl.

19. The method of claim 14 wherein the vinylidene fluoride polymer is a copolymer of vinylidene fluoride and tetrafluoroethylene in about a 70/30 weight ratio.

20. The method of claim 14 wherein the coalescing agent is selected from the group consisting of butyrolactone, tributyl phosphate, butyl cellosolve acetate, tributoxyethyl phosphate and carbitol acetate.

21. The method of claim 14 wherein the aqueous dispersion contains in admixture from about 30 to about 170 parts per 100 parts by weight of polymer of particulate pigment, provided that the total of pigment and polymer in the dispersion is not greater than about 200 parts per 100 parts by weight of water.

22. The composition of claim 1 in which said vinylidene fluoride polymer is vinylidene fluoride homopolymer or a copolymer of vinylidene fluoride with at least one comonomer selected from the group consisting of tetrafluoroethylene, trifluoroethylene, chlorotrifluoroethylene, hexafluoropropene and mixtures thereof in which the copolymer contains at least about 75 mole percent of polymerized vinylidene fluoride units.

23. The method of claim 14 in which said vinylidene fluoride polymer is vinylidene fluoride homopolymer or a copolymer of vinylidene fluoride with at least one comonomer selected from the group consisting of tetrafluoroethylene, trifluoroethylene, chlorotrifluoroethylene, hexafluoropropene and mixtures thereof in which the copolymer contains at least about 75 mole percent of polymerized vinylidene fluoride units.

* * * * *